US005689898A

United States Patent [19]

Renzi

[11] Patent Number: 5,689,898

[45] Date of Patent: Nov. 25, 1997

[54] FREEZE DRYER SHELF

[75] Inventor: Ernesto Renzi, Youngstown, N.Y.

[73] Assignee: The BOC Group, Inc., New Providence, N.J.

[21] Appl. No.: 610,817

[22] Filed: Mar. 7, 1996

Related U.S. Application Data

[62] Division of Ser. No. 849,846, Mar. 12, 1992, Pat. No. 5,519,946.

[51] Int. Cl.[6] .......... A01F 25/12

[52] U.S. Cl. .......... 34/239; 34/297

[58] Field of Search .......... 165/165, 168, 165/170, 166; 34/284, 285, 286, 237, 293, 296, 297, 301, 239

[56] References Cited

U.S. PATENT DOCUMENTS

| | | | |
|---|---|---|---|
| 3,145,562 | 8/1964 | Hamilton et al. | 34/284 |
| 3,146,077 | 8/1964 | Fuentevilla | 34/284 |
| 4,521,975 | 6/1985 | Bailey | 34/285 |
| 4,804,041 | 2/1989 | Hasegawa et al. | 165/166 |
| 4,934,455 | 6/1990 | Hasegawa | 165/166 |
| 4,953,299 | 9/1990 | Gimeno et al. | 34/92 |
| 5,452,758 | 9/1995 | Mautererer | 165/145 |

FOREIGN PATENT DOCUMENTS

| | | | |
|---|---|---|---|
| 8074103 | 5/1983 | Japan | 34/297 |

*Primary Examiner*—Henry A. Bennett
*Assistant Examiner*—D. Doster
*Attorney, Agent, or Firm*—David M. Rosenblum; Salvatore P. Pace

[57] ABSTRACT

The present invention provides a shelf for a freeze dryer which includes a pair of first and second flat plates spaced apart from one another, and a plurality of ribs located between the first and second plates and spaced from one another so as to define flow channels for circulating a diathermic fluid. The ribs are preferably formed of hollow tubes that are brazed to the first and second plates and the hollow tubes and plates are stress relieved so that the first plate presents a flat surface at which heat is transferred from articles to be freeze dried and the diathermic fluid. A freeze dryer shelf constructed in such manner has less thermal mass than prior art design which have solid ribs and plates welded to the ribs with a thickness sufficient to prevent the formation of surface deformations that would interrupt the flat surface of the first plate. Additionally, the freeze dryer shelf of the present invention can have a diathermic fluid section on which the articles are supported and a refrigerant section in good thermal contact therewith. A diathermic fluid circulated through the diathermic fluid section cools the articles to the freezing point of water while the diathermic fluid is cooled by a refrigerant circulating through the refrigerant section. Such heat exchange provided for in the freeze dryer shelf helps eliminate heat leeks that are involved in prior art freeze driers using external heat exchangers.

7 Claims, 3 Drawing Sheets

FREEZE DRYER SHELF

This is a division of application Ser. No. 08/849,846, filed Mar. 12, 1992, now U.S. Pat. No. 5,519,946.

BACKGROUND OF THE INVENTION

The present invention relates to freeze drier shelves for supporting articles such as substances or vials or trays containing the substances within freeze driers. More particularly, the present invention relates to such freeze drier shelves in which the shelf also functions in the freezing and sublimation phases of the freeze drying process to freeze and heat the articles through circulation of a diathermic fluid through the shelf.

Freeze drier shelves are located within a freeze drying chamber of a freeze drier for supporting articles such as biological substances or more commonly, vials containing the biological substances to be freeze dried. The shelves are disposed in a vertical stack that may be collapsible in order to stopper the vials.

The shelves also serve to transfer heat between a diathermic fluid such as alcohol, glycol, mineral oil, and etc. and the articles to be freeze dried. During the freeze drying process, moisture present within the articles is frozen. After freezing, the articles are subjected to subatmospheric pressures that are low enough to enable the moisture to sublime into a vapor. To this end, diathermic fluid circulating within the freeze drier shelves is first cooled by an external refrigeration circuit in order to cause heat to be transferred from the articles to the diathermic fluid and thereby cause the freezing of the moisture contained within the articles. During sublimation, the diathermic fluid is slightly heated by an external heater in order to provide energy for the sublimation.

Since the freeze drying process occurs in a low pressure environment, heat transfer between the articles and the diathermic fluid occurs principally by conduction. As may be appreciated, it is critical that the shelves be as flat as possible in order to maximize the contact between the shelves and the articles. This maximization of contact in turn maximizes the degree of the conductive heat transfer between the articles and the shelves and hence, the diathermic fluid.

In the prior art, freeze dryer shelves are formed by two opposed stainless steels plates framed at the edges by a solid steel frame in order to form a space between the plates. Solid ribs traverse the space between the plates in order to form flow channels for the diathermic fluid. In one type of design, the ribs are longitudinally welded to the plates and are configured to interlock in order to form the flow channels when the plates and ribs are assembled. In another type of design, the ribs are simply welded to one of the plates. Holes are then drilled into the opposite of the plates and such plate is plug welded to the ribs. The resultant raised weld beads are ground flush and polished.

The problem with both types of of prior art freeze dryer shelf construction is that the welds will tend to thermally stress the plates in the vicinity of the welding. In order to reduce concomitant straining and thus, local deformation of the plates near the welding, very thick plates are used in fabricating the shelves and solid ribs are used in forming the flow channels for the diathermic fluid. The end result of the solid rib and thick plate construction of prior art freeze drier shelves is that each shelf possesses a sizable thermal mass or inertia. The result of this thermal mass or inertia is that a large fraction of the energy requirement of the freeze drier during the cooling phase of the freeze drying process is wasted in cooling the shelves.

In addition to the foregoing, the energy required in effecting the cooling is also wasted through heat leakage occurring during the cooling of the diathermic fluid. In the refrigeration circuit used in cooling the diathermic fluid, an external heat exchanger is provided to transfer heat from the diathermic fluid to a recoverable refrigerant such as FREON. Inevitably, there are thermal losses in the heat exchanger and the piping involved in conducting the cooled diathermic fluid back into the freeze drying chamber. As may be appreciated, such heat leakage must be compensated for by increasing the amount of refrigeration provided by the refrigeration circuit and thus, the energy required to provide the refrigeration.

As will be discussed, the present invention provides a shelf design that provides the requisite shelf flatness while having less thermal mass than prior art freezer shelf designs. In addition, a shelf design is provided in the present invention that minimizes heat leakage during the cooling of the diathermic fluid.

SUMMARY OF THE INVENTION

The present invention provides a freeze drier shelf adapted to support articles to be freeze dried within a freeze drying chamber. The shelf has a pair of opposed, flat parallel first and second plates spaced apart from one another and a plurality of parallel ribs defining flow channels for circulating a diathermic fluid between the first and second plates. Connections are provided for connecting the first and second plates to the ribs. The first and second plates have predetermined thicknesses and essentially no local deformations in the first and second plates at the connections.

The freeze drier shelf has a thermal mass associated therewith. This thermal mass is reduced in the present invention by providing first and second plates having a reduction in their predetermined thicknesses. The first and second plates are connected to the ribs at opposed flat surfaces of the ribs. It is to be pointed out that the reduction of plate thickness provided for in the present invention would be difficult if not impossible to connect by welding. Even if such structure were welded together, local deformations would occur at the connections which would interrupt the requisite flat, heat conductive surface to be provided by the shelf. It has been found by the inventor herein, however, that if the connections comprise the first and second plates being internally brazed to the ribs at their flat surfaces and stress relieved, local deformations that would otherwise exist at the connection to the reduction in the thicknesses of the first and second plates will be substantially prevented. It is to be recalled that a freeze drier shelf must present as flat a surface as possible to the articles to be freeze dried in order to maximize heat transfer by conduction.

In another aspect, the present invention provides a freeze dryer shelf adapted to support articles to be freeze dried within a freeze drying chamber. The freeze drier shelf has internal flow channels for circulating a diathermic fluid within the shelf. The diathermic fluid is adapted to be cooled by the refrigerant such that moisture within the articles freezes while the articles are being supported by the shelf. The freeze dryer shelf comprises an upper diathermic section and a lower refrigerant section in good thermal contact with the upper diathermic section. The upper diathermic section has the flow channels for the diathermic fluid. The lower refrigerant section has the flow passages for circulating the refrigerant through the lower refrigerant section such that the diathermic fluid is cooled while circulating through the freeze drier shelf.

A freeze dryer shelf formed in accordance with this latter aspect of the present invention does not require the use of an external heat exchanger to transfer heat between the diathermic fluid and the refrigerant, but instead integrates the heat exchanger into the shelf design. The advantage of this is that the integral heat exchanger of the present invention is exposed to the low pressure environment of the freeze drying chamber while heat exchange is taking place and thus, is in effect vacuum insulated to substantially reduce heat leakage. Additionally, heat leakage into the diathermic fluid that occurs along the external piping into the freezing chamber is also eliminated.

As can be appreciated, a freeze drier shelf designed in accordance with either of the aspects of the present invention provides far more energy efficiency than prior art designs. As such, either of these aspects of the present invention could be used in their own right in increasing the energy efficiency of a freeze drier. However, both aspects can be advantageously incorporated into a freeze drier shelf design to further increase the energy efficiency of a freeze drier.

BRIEF DESCRIPTION OF THE DRAWINGS

While the specification concludes with claims distinctly pointing the subject matter that Applicant regards as his invention, it is believed that the invention would be better understood when taken in connection with the accompanying drawings in which:

DETAILED DESCRIPTION

Figure 1:
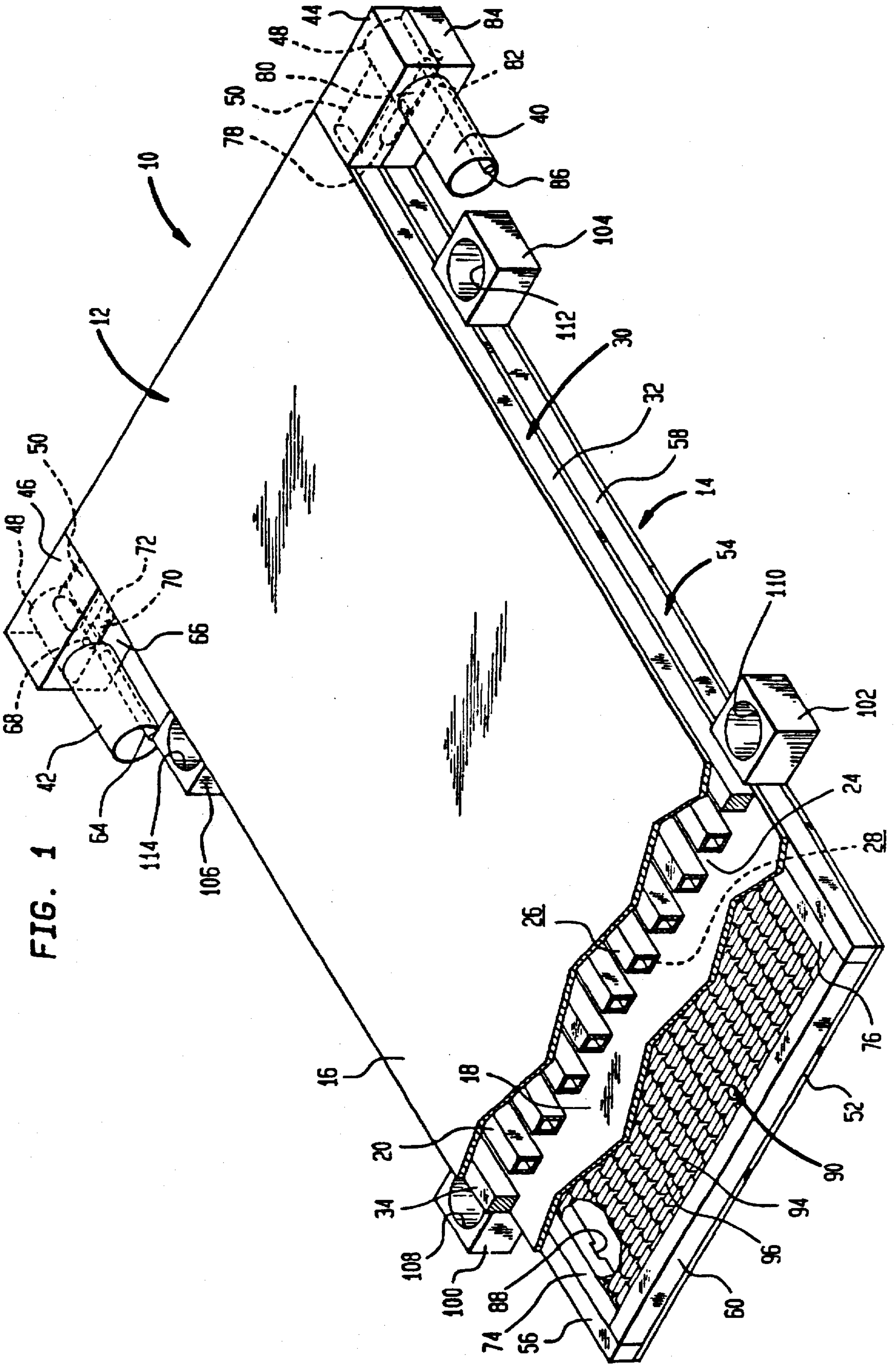
FIG. 1 is a perspective view-of a freeze dryer shelf in accordance with the present invention, with portions of the shelf broken away to illustrate its internal structure.

With reference to FIG. 1, a freeze drier shelf 10 in accordance with the present invention is illustrated. Freeze drier shelf 10 has a top diathermic fluid section 12. Diathermic fluid section 12 supports the articles to be freeze dried and, as will be discussed, is designed to receive and circulate a cooled diathermic fluid so that heat is transferred from the articles being supported to the diathermic fluid. A bottom refrigerant section 14 is situated beneath diathermic fluid section 12 and is in good thermal contact therewith. As will also be discussed, refrigerant section 14 is designed to receive and circulate a refrigerant to cool the diathermic fluid circulating through diathermic fluid section 12.

Figure 2:
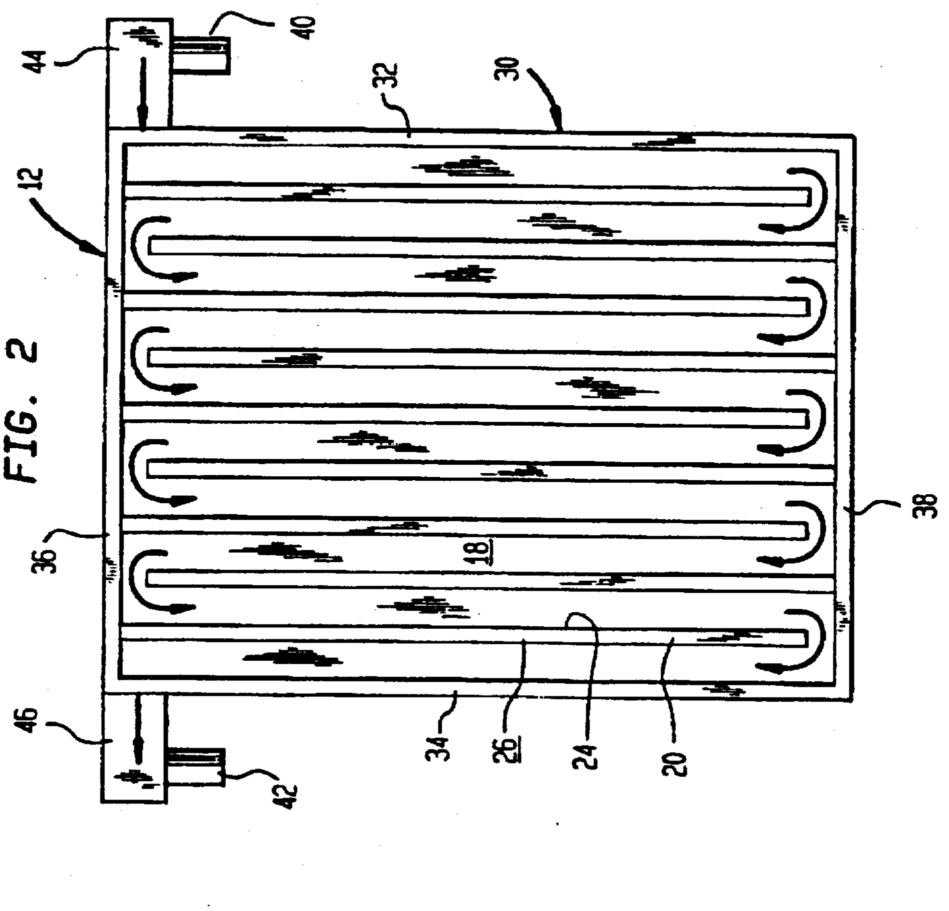
FIG. 2 is a top plan view of a freeze drier of FIG. 1 with a top plate broken away to illustrate the internal structure of a top diathermic fluid section of the freeze dryer shelf.

With additional reference now to FIG. 2, diathermic fluid section 12 is provided with a pair of first and second plates 16 and 18. Both plates are flat, parallel and spaced apart from one another. A plurality of ribs 20 are provided between the space formed between first and second plates 16 and 18. Ribs 20 are spaced apart to define flow channels 24 for the diathermic fluid. In this regard, ribs 20 are staggered relative to one are another in order to produce a parallel serial flow path through diathermic fluid section 16, and thereby minimize pressure drop.

Ribs 20 are preferably hollow rectangular tubes. They can additionally be any form having elongated flat surfaces, such as designated herein by reference numerals 26 and 28, in contact with first and second plates 16 and 18, respectively. If the ribs are solid, however, as in the prior art, the thermal mass of the shelf will of course be greater than the illustrated embodiment having hollow ribs. Diathermic fluid section 16 is peripherally sealed by a frame 30 formed of rods having a square transverse cross-section (designated by reference numerals 32, 34, 36 and 38) connected end to end and connecting first and second plates 16 and 18.

Diathermic fluid flows into and is discharged from diathermic fluid section 16 (as indicated by the arrowheads) by a set of first inlets and outlets formed by inlet and outlet pipes 40 and 42 connected to inlet and outlet tab portions 44 and 46, provided with internal drillings 48 and 50. Diathermic fluid enters enters into and is discharged from flow channels 24 through apertures 51 defined in rods 32 and 34 and in communication with each of the internal drillings 50 of end tab portions 44 and 46. Inlet and outlet pipes 42 and 44 serve as connection points at which well known convoluted, flexible stainless steel hoses are welded. Such hoses run to an external circuit for the diathermic fluid which conventionally includes a pump to circulate the diathermic fluid and an electrical heater to heat the diathermic fluid during the sublimation phase of the freeze drying process.

A freezer shelf in accordance with the present invention could be constructed in line with diathermic fluid section 12 as outlined above. In such case, an external heat exchanger, well known in the art, would be provided to transfer heat between a refrigerant flowing in a refrigerant circuit and the diathermic fluid. It is to be noted here that a refrigerant is not used alone to circulate through a freeze dryer shelf because it is impractical to provide a near uniform temperature distribution across the shelf with a refrigerant alone.

Preferably though, a freeze drier shelf in accordance with the present invention is designed to act as a heat exchanger to transfer heat from the diathermic fluid to the refrigerant. In the illustrated embodiment this is accomplished by providing freeze drier shelf 10 with refrigerant section 14. With additional reference to FIGS. 3 and 4, refrigerant section 14 is peripherally sealed by a frame 54 formed by rods of transverse square cross-section (designated by reference numerals 56, 58, 60 and 62), connected end to end and connecting second and third plates 18 and 52. Refrigerant enters and is discharged from refrigerant section 18 by way of a second set of inlet and outlets formed by an inlet tube 64 which is welded to an inlet tab portion 66 and in communication with drillings 68 and 70 provided within inlet tab portion 66. A transfer tube 72 provides fluid communication from drilling 70 to an inlet manifold 74 abutting rod 56 of frame 54. Refrigerant is discharged from refrigerant section 14 by way an outlet manifold 76 abutting rod 60 of frame 54, another transfer tube 78 which provides fluid communication to drillings 80 and 82 within an outlet tab portion 84. An outlet tube 86 is welded to outlet tab portion 84 and is aligned with drilling 82.

It is to be noted that inlet and outlet pipes 42 and 44 are welded to both inlet and outlet tab portions 44 and 84; and 66 and 46, respectively. Furthermore adjacent inlet and outlet tab portions 44 and 84 are welded to one another as are inlet and outlet tab portions 66 and 46.

Although not illustrated, refrigerant lines would be welded to inlet and outlet tubes 64 and 86 to connect refrigerant section 14 within a refrigerant circuit. As such, the refrigerant lines would be located within the diathermic fluid lines carrying diathermic fluid to and from diathermic fluid section 12 of freeze dryer shelf 10. Where connection is required within the refrigerant circuit of the refrigerant lines, the diathermic fluid lines would be provided with rigid pipe-like sections without convolutions. Such rigid pipe-like sections would be provided with openings for passage of the refrigerant lines out of the diathermic fluid lines, preferably by 90° bends provided in the refrigerant lines, penetrating the openings, and welded to the rigid pipe-like sections of the diathermic fluid lines.

Inlet and outlet manifolds 74 and 76 are of identical design and both are formed by square pipes provided with six lower equally spaced, slot like openings such as a slot-like opening 88 shown for manifold 74.

Figure 3:
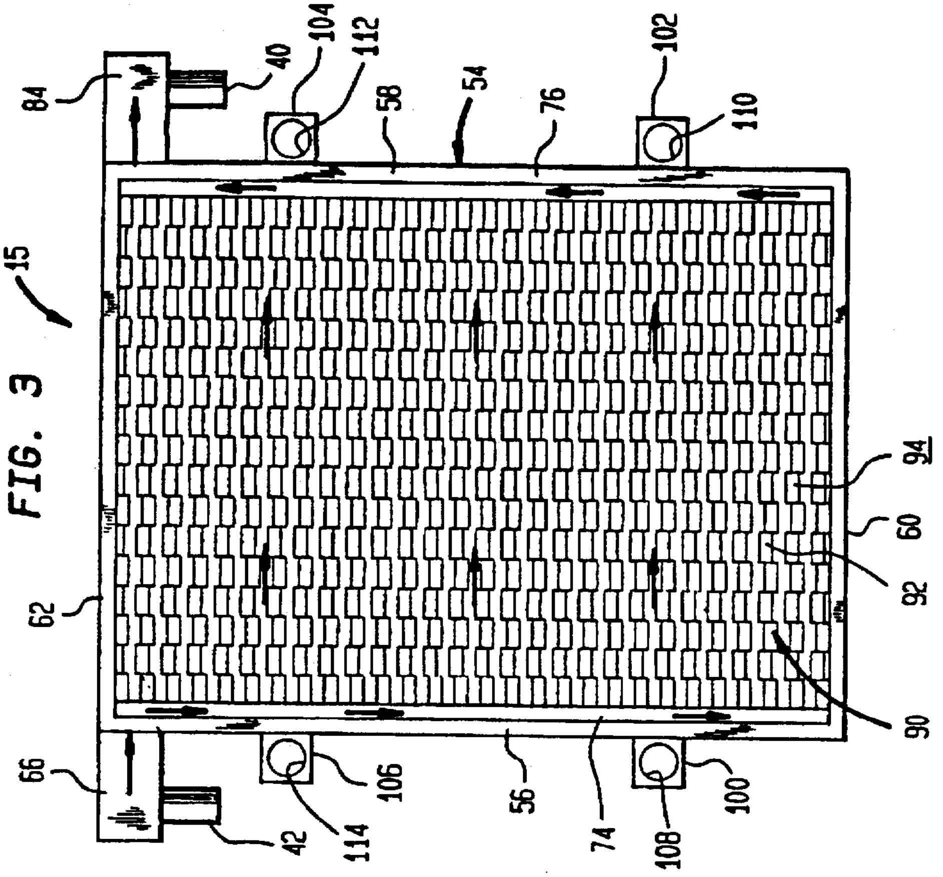
FIG. 3 is a top plan view of a freeze drier shelf of FIG. 1 with the top diathermic fluid section of the shelf broken away to illustrate the internal structure of a bottom refrigerant section of the freeze drier shelf.
Figure 4:
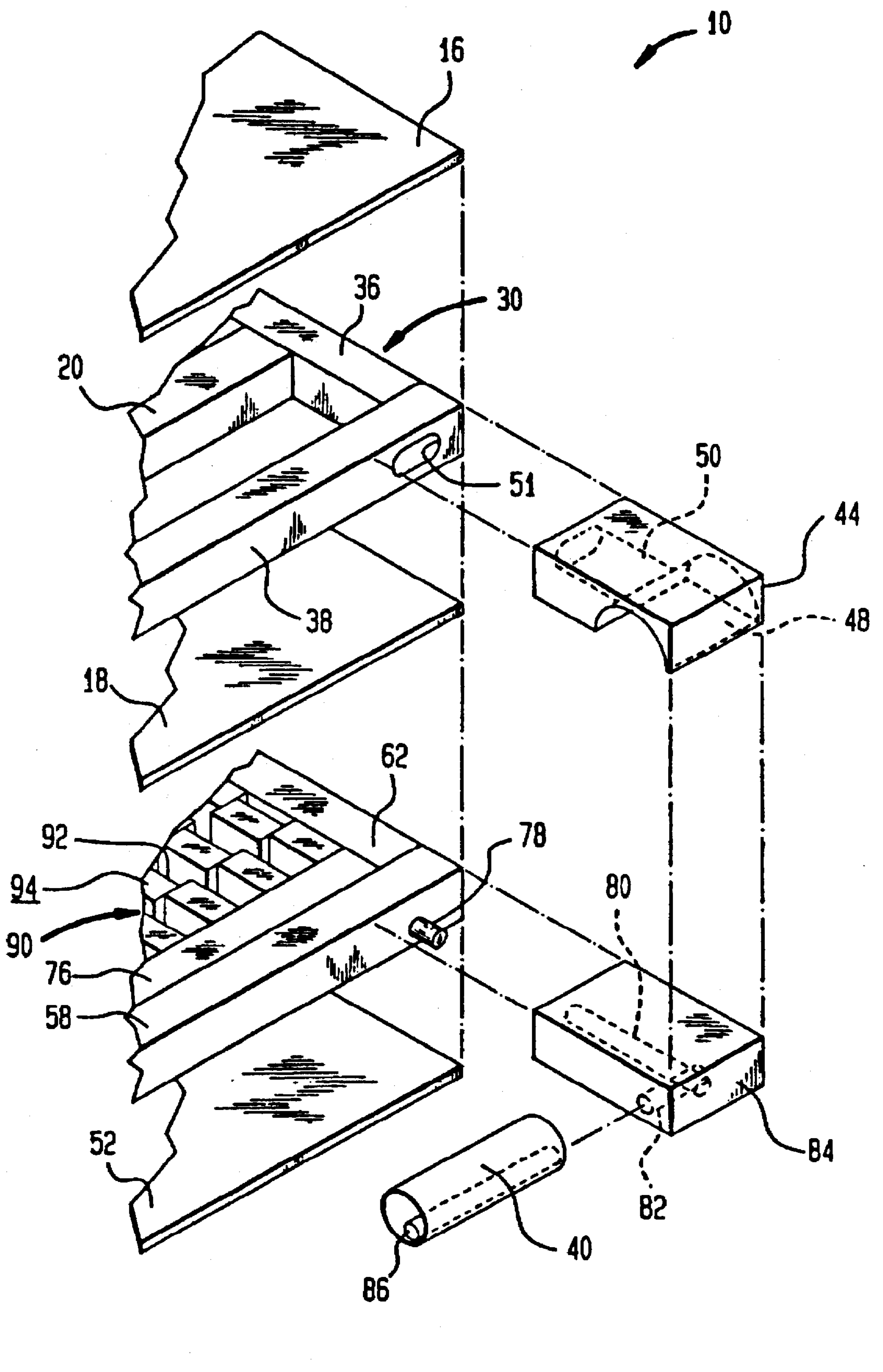
FIG. 4 is a fragmentary exploded perspective view of the freeze drier shelf of FIG. 1.

In an application of the present invention to a very small freezer, flow passageways for the refrigerant could be of arbitrary design. However, in large scale applications, fins 90 are provided which connect second and third plates 18 and 52. Fins 90 provide flow passages 92 for the refrigerant circulating between inlet and outlet manifolds 74 and 76 as indicated by the arrowheads of FIG. 3. Fins 90 are required in such large scale applications to provide a large heat transfer surface to conduct heat from the diathermic fluid to the refrigerant. Fins 90 are preferably formed of a prefabricated material comprising a stainless steel sheet longitudinally embossed with elongated embossments of essentially rectangular transverse cross-section to provide alternating upper and lower elongated surfaces 94 in contact with second and third plates 18 and 52. Such a material is also transversely pierced by, for instance, piercing 96 to increase fluid contact. As with diathermic fluid section 12, second and third plates 18 and 52 are internally brazed to the material providing fins 90 at surfaces 94 so that the assemblage is stress relieved. Such material can be obtained from Robinson Fin Machines, 13670 Highway 68, South Kenton, Ohio 43326.

In addition to providing a large surface contact area for the refrigerant to conduct heat from the diathermic fluid Fins 90 also provide a sufficient structural support to refrigerant section such that freeze dryer shelf 12 can bear down on stoppers of vials supported by a shelf of identical design located beneath shelf 12. In this regard, shelf 12 is provided with 4 shelf support blocks 100, 102, 104, and 106 having openings 108, 110, 112, and 114 to receive support rods well known in the art to connect freeze dryer shelf 10 to identically designed shelves located above and below freeze dryer shelf 10.

Freeze dryer shelf 10 can be fabricated in a variety of sizes, for instance 600 mm×450 mm or 600 mm×900 mm or 900 mm×1200 mm, or even 1500 mm×1800 mm. The 600×900 mm and the 900×1200 mm shelves can incorporate ribs formed by about 9.525 mm square pipe. The 600 mm×450 mm shelves can incorporate ribs formed by about 12.7 mm×6.35 mm rectangular pipe, and the 1500 mm×1800 mm shelves can incorporate ribs formed by about 19.05 mm square pipe. In all embodiments, the pre-fabricated fin material can be approximately 0.2 mm thick, and 6 mm to 8 mm in height and width. The spacing between ribs depends upon the pressure to which the shelf is subjected and the mechanical strength required. In smaller shelves, 70 mm center to center is sufficient, while for the larger shelves, for instance 1500 mm×1800 mm, a 45 mm spacing can be used.

All of the components used in a sterilized application for freeze drier shelf 10 (as an example in manufacturing biological preparations) should be fabricated from stainless steel. In order to fabricate shelf 12, a well known type of nickel brazing substance which can comprise a nickel powder on a self-adhesive backing is sandwiched between first plate 16 and ribs 20 and 22; between ribs 20 and 22 and the second plate 18; between the underside of second plate 18, and the prefabricated fin material; and between prefabricated fin material 90 and third plate 52. The assemblage is then again sandwiched between graphite blocks or any heat conductive material and then placed within a vacuum induction furnace. The assemblage is then heated in the furnace in a temperature that ramps from room temperature to approximately 10° C. of the melting of nickel, approximately 482° C. The temperature is then stabilized and then again ramped up to the melting point of nickel and the crystallization temperature of the stainless steel. This temperature is stabilized for between 15 and 20 minutes in order to stress relieve the assemblage of components. Thereafter, the furnace is cooled down for about 12 hours until 204° C. is reached, at which point, the entire assemblage is quenched with an inert gas which can be nitrogen. Thereafter, the assemblage is allowed to cool to room temperature. Frames 30 and 54 are then welded to the plates and preferably ground, smoothed, and polished.

The end result of the construction method outlined above, is that freeze dryer shelf 12 is fabricated without welding and is thus made with less thermal mass than prior art shelf designs. In this regard, first, second, and third plates in any embodiment can be as low as about 1.0 mm thick. In the prior art, the steel plates making up the freeze drying shelves could be as much as about 4.0 mm thick.

While a preferred embodiment has been shown and described in detail, it would be appreciated by those skilled in the art, that numerous additions, omissions and changes may be made without departing from the spirit and scope of the invention.

I claim:

1. In a freeze drier shelf adapted to support articles to be freeze dried within a freeze drying chamber of a freeze drier and having internal flow channels for circulating a diathermic fluid within the shelf, the diathermic fluid adapted to be cooled by a refrigerant such that moisture within the articles freezes while the articles are being supported by the shelf, the improvement comprising:

the freeze dryer shelf comprising a top diathermic fluid section adapted to support the articles and a bottom refrigerant section in good thermal contact with the top diathermic fluid section;

the top diathermic section having the flow channels for the diathermic fluid;

the bottom refrigerant section having flow passages for circulating the refrigerant through the lower refrigerant section such that the diathermic fluid is cooled while circulating through the freeze drier shelf;

a first set of inlet and outlet means for introducing and discharging the diathermic fluid into and from the diathermic fluid section of the freeze dryer shelf, respectively; and a second set of inlet and outlet means for introducing and discharging the refrigerant into and from the refrigerant section of the freeze dryer shelf, respectively.

2. The improvement of 1, wherein:

the top diathermic fluid and bottom refrigerant sections comprise: a set of three, parallel, flat plates spaced apart from one another; first and second means for forming the flow channels between the first and second plates and for forming the flow passages between the second and third plates, respectively, and peripheral seal means for peripherally sealing the first and second plates and the second and third plates; and the first and second sets of inlet and outlet means penetrate the peripheral seal means so that the diathermic fluid is introduced and discharged from the flow channels between the first and second plates and the refrigerant is introduced and discharged from the flow passages between the second and third plates.

3. The improvement of claim 2, wherein:

the first means comprise a plurality of hollow tubes having opposed, elongated flat surfaces in contact with the first and second plates, the tubes spaced apart to form the flow channels for the diathermic fluid;

the second means comprise an embossed sheet having elongated, transversely rectangular embossments to form the flow passages for the refrigerant, the embossments having a plurality of substantially parallel and opposite flat surfaces in contact with the second and third sheets; and the first and second plates and the elongated flat surfaces of the hollow tubes and the second and third plates and the opposite flat surfaces of the embossments brazed together and stress relieved so that the first of the plates presents a top surface essentially uninterrupted by local surface deformations at the brazing of the first, second, and third plates and the elongated flat surfaces and the opposed flat surfaces of the hollow tubes and the corrugated material.

4. The improvement of claim 3, wherein the embossments and hollow tubes are situated at right angles to one another.

5. The improvement of claims 3 or 4 wherein the hollow tubes are arranged to form a series/parallel flow path through the diathermic fluid section.

6. The improvement of claim 5, wherein the hollow tubes comprise rectangular pipes.

7. The improvement of claim 6, wherein the peripheral sealing means comprises two frames located between the first, second, and third plates welded thereto.

* * * * *